United States Patent [19]
Parulski et al.

[11] Patent Number: 5,218,459
[45] Date of Patent: Jun. 8, 1993

[54] PRINT SCANNER WITH SOFT KEY VARIABLE MAGNIFICATION

[75] Inventors: Kenneth A. Parulski; Vance E. Cochrane; John C. Rutter, all of Rochester, N.Y.

[73] Assignee: Eastman Kodak Company, Rochester, N.Y.

[21] Appl. No.: 760,438

[22] Filed: Sep. 16, 1991

[51] Int. Cl.$^5$ .............................................. H04N 1/00
[52] U.S. Cl. .................................................. 358/451
[58] Field of Search ........................ 358/451, 214–216, 358/487, 468; 350/429

[56] References Cited

U.S. PATENT DOCUMENTS

| | | | |
|---|---|---|---|
| 4,487,482 | 12/1984 | Itoh et al. | 358/451 |
| 4,496,983 | 1/1985 | Takenaka | 358/451 |
| 5,048,106 | 9/1991 | Nakajima et al. | 358/451 |

*Primary Examiner*—Stephen Brinich
*Attorney, Agent, or Firm*—Edward Dugas

[57] ABSTRACT

A zoom lens magnification control mechanism for a photoprint digitizing scanner contains an adjustable focus, zoom lens. The photoprint image projection path is incident upon a high resolution CCD sensor, image output signals from which are digitized for storage on a compact disc. Control of the operation of the scanner includes the use of a display device to which output signals provided by the photosensor are coupled so as to display the projected image. Whenever a photoprint is presented to the scanner an indication of the size of the photoprint is provided, as by way of a code stored on a photoprint platen, in order to set the magnification setting of the zoom lens. The photofinisher observes the display of the image projected on the photosensor and adjusts, as necessary, the operation of the zoom lens so that the image displayed by the display device fits the display screen. Using a program feature of a user interface, the photofinisher stores in memory information representative of the adjustment of the operation of zoom lens. Then, for subsequent presentations of photoprints to the scanner, the stored adjustment information is used as a magnification setting default value for a respective photoprint size. Whenever the magnification of the zoom lens is adjusted, there is an accompanying change in the focus ring of the lens, so that the displayed image is maintained in focus.

39 Claims, 12 Drawing Sheets

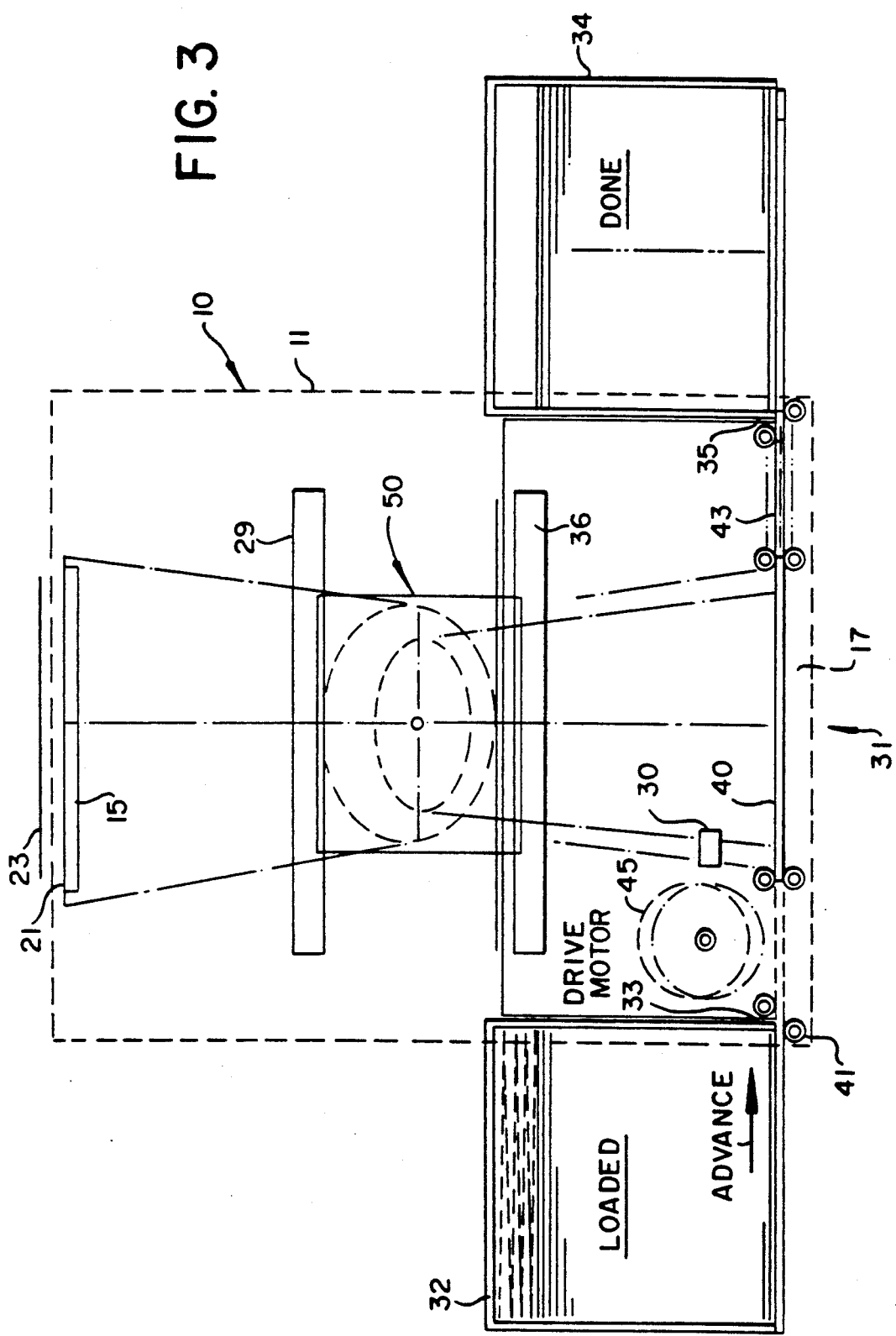

FIG. 9

RESET MODE

POWER-UP=1
OR
RESET=1

MOVE TO GREEN FILTER } 151
MOVE TO DITHER POSITION

GO TO FRAME MODE

SLEEP MODE

LIGHT, FRAME, FOCUS & CAPTURE BUTTONS } 153
HOLD OFF SHUTTER

FRAME=1
→ GO TO FRAME MODE

FOCUS=1
→ GO TO CAPTURE MODE

CAPTURE=1
→ GO TO CAPTURE MODE

PRINT SCANNER WITH SOFT KEY VARIABLE MAGNIFICATION

FIELD OF THE INVENTION

The present invention relates to a photoprint digitizing scanner having a variable magnification zoom lens, respective magnification and focus settings for which may be changed in order to accommodate different sized photoprints, and is particularly directed to a mechanism for adjusting, storing and retrieving default magnification and focus settings for a zoom lens, so as to facilitate sequential scanning of a plurality of photoprints having similar dimensional characteristics.

BACKGROUND OF THE INVENTION

Recent improvements in their spatial and data resolution capabilities have made digital color image processing systems attractive for a number of photoprocessing (e.g. photo-finishing) applications. In still color image photography, for example, once an image (such as that captured on color photographic film or a high resolution color digital camera) has been digitized and stored in an attendant data base, it is readily optimized for reproduction by means of photofinishing image processing software. Such image processing systems also provide for the storage and retrieval of high resolution digitized color still images for application to a variety of reproduction devices. This not only enables the photofinisher to optimize the quality of a color image print, but allows the images on a processed roll of film to be stored in digital format on a compact disc (CD), which may then be delivered to the customer for playback by a CD player and display on a television set.

One such apparatus is described in co-pending U.S. patent application Ser. No. 582,305, filed Sep. 14, 1990, entitled "Multiresolution Digital Imagery Photofinishing System," by S. Kristy, assigned to the assignee of the present application and the disclosure of which is herein incorporated. As diagrammatically illustrated in FIG. 1, such a digitizing apparatus may employ a high resolution opto-electronic film scanner 12, the output of which is coupled to a host digitized image processor (host computer) 14. Scanner 12 typically contains a very high resolution sensor pixel array (e.g. a 3072×2048 pixel matrix) capable of generating high spatial density-representative output signals which, when converted into digital format, yield 'digitized' photographic image files from which high quality color prints may be obtained. Scanner 12 is arranged to be optically coupled with a photographic recording medium, such as a consumer-supplied 35 mm color film strip 16. Film strip 16 contains a plurality (e.g. a set of twenty-four or thirty-six) 36 mm×24 mm color image frames. For each scanned image frame, high resolution scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied in the form of an imaging pixel array-representative bit map, resolved to a prescribed code width (e.g. eight bits per color per pixel), to a host processor 14. Host processor 14 contains an image encoding and storage operator through which each high resolution digitized image file is stored, preferably in a multi-resolution, hierarchical format. Such a storage format facilitates retrieval of the digitized images for reproduction by a variety of devices the resolution of which may vary from device to device, such as a low/moderate NTSC television monitor or a very high resolution, digitally driven, color thermal printer. The spatial parameters of each of the hierarchical image files into which an original 2K pixel×3K pixel digitized image file is encoded and stored are chosen to facilitate the implementation and incorporation of a low cost, reduced complexity frame store/data retrieval architecture into a variety of reproduction devices, thereby providing for rapid call-up and output (display or print out) of one or more selected images.

In addition to using such improved photofinishing equipment to process current day images, such as capturing original color images in digital format by way of a high resolution digitizing color camera, or scanning a roll of color negative film, there is also the demand for using such digital image processing capability to convert 'old' photographs, such as dated photoprints that have been kept in a loose pile in a 'shoebox', or mounted in a family photo album, into digital format for CD storage, thereby allowing a customer to store and catalog the images on such prints for subsequent television viewing.

In consideration of this need, co-pending U.S. patent application Ser. No. 762,323, filed Sep. 16, 1991, by K. A. Parulski et al, entitled "Dual Imaging Station Scanner", assigned to the assignee of the present application and the disclosure of which is herein incorporated, describes a digitizing scanner apparatus which has the ability to automatically digitize a plurality of photoprint images which the customer brings to the photofinisher in a loosely arrayed pile or mounted in a photo-album binder, thereby allowing a photofinisher to rapidly process any number of pictures provided by the customer, irrespective of the condition or form in which the photoprints are supplied.

More particularly, FIG. 2 is an exterior perspective view, while FIGS. 3 and 4 are diagrammatic respective front and side views of the internal architecture of a dual imaging station, photoprint digitizing scanner described in the above-referenced Parulski et al application. The scanner, which is shown generally at 10, preferably comprises a housing or cabinet 11, having an upper, horizontally translatable unit 13, which supports a large area imaging station 15 for viewing an individual photoprint either by itself or retained on a page of a photo album or the like. Beneath unit 13 (and upper imaging station 15) is a lower, magazine-fed platen imaging station 17. Translatable unit 13 is supported for back and forth horizontal movement (or translation) in the direction of arrows A, either manually or by a drive motor (not shown), for the purpose of bringing a desired portion of imaging station 15 into optimum registration with viewing optics through which a photoprint is imaged onto a downstream opto-electronic image sensor.

The upper imaging station 15 comprises a transparent (e.g. glass) plate 21 upon which an individual sheet of photographic recording material, such as a photoprint, 23 may be placed in a face-down condition. Adjacent to top plate 21, translatable unit 13 has a sloped support surface 25, thereby providing, in cooperation with top plate 21, a broad area surface for supporting a large item, such as a photo album (shown diagrammatically in broken lines 27 in its open, face-down condition), so that a page of the photo album may be easily placed in direct imaging-abutment with top plate 21. A first imaging station illuminator 29 comprised of a rectangular configuration of a set of four fluorescent lamps is located beneath top plate 21, so as to provide effectively even illumination of a sheet or page of recording material that is placed face down on the top plate.

A lower portion of cabinet 11 retains a platen feed mechanism 31, which is operative to withdraw and translate a photographic print support platen from a first platen supply magazine 32 to a platen imaging station 17, and then feed the platen from the platen imaging station to a second take up platen storage magazine 34. An individual platen is preferably of a type detailed in co-pending U.S. patent application Ser. No. 760,437, filed Sep. 16, 1991, entitled "Photoprint Retaining Platen For Digitizing Image Scanner", by K. A. Parulski et al, assigned to the assignee of the present application and the disclosure of which is herein incorporated.

A photoprint-support platen as described in that application may be generally configured as diagrammatically illustrated at 18 in FIG. 5, to facilitate presentation of a photoprint to an imaging station of a photoprint imaging scanner, in a secure protected condition, while also allowing a plurality of photoprint platens to be arranged in a stacked configuration and fed one at the time to a platen imaging station, and then fed from the platen imaging station to a take up location. Preferably, a photoprint support- platen includes a photoprint-retention or mounting surface area 19 which contains a semi-tacky material 20 for removably securing a photoprint to the platen, so that the platen may be re-used with other photoprints. Adjacent to the mounting surface area are side rails 22 and the ends 26 of the platen are sloped or beveled to facilitate interleaving of multiple platens in a stack, without the mounted photoprints being contacted by an adjacent platen. One or more image parameter regions 28 are located adjacent to a photoprint mounting surface area for storing machine readable photoprint parameter information (e.g. bar codes or adjustable indicator elements). This machine readable information is detected by one or more image parameter sensors 30 located in the feed path of platen imaging station 17. The outputs of these sensors are coupled to a microcontroller 38, such as an Intel 80C196KB microcontroller which controls the operation of the scanner, including the imaging optics, to rapidly project and focus the image on the photoprint onto an opto-electronic image sensor (e.g. a high resolution CCD image sensor) 60.

The platen feed mechanism comprises a set of controllably driven pinch rollers 41 located between magazine 32 and platen imaging station 17, and a set of controllably driven pinch rollers 43 located between platen imaging station 17 and magazine 34. A controllably stepped drive motor 45 is coupled to rollers 41 and 43 by means of a conventional pulley/drive belt arrangement, not shown, and is controllably driven by the system microcontroller to rotate the pinch rollers and thereby sequentially extract a platen from a bottom slot 33 of supply magazine 32, translate an extracted platen to imaging station 17 and then translate the platen from imaging station 17 to a lower entry slot 35 of take up storage magazine 34. A second imaging station illuminator 36 comprised of a rectangular configuration of a set of four fluorescent lamps, similar to that of illuminator 29 for the first imaging station 15, is located directly above platen imaging station 17, so as to provide effectively even illumination of an individual photoprint carried by a platen that has been transported to imaging station 17.

Supported within housing 11 between upper and lower imaging stations 15 and 17 is a multi-directional image projection mechanism 50. Image projection mechanism 50 is operable to selectively project the image of a photoprint at a selected one of imaging stations 15, 17 onto an opto-electronic image sensor 60, such as a high resolution CCD sensor, the 1536×1024 pixel array of which is electronically scanned and digitized to obtain a digitized image, which is stored in an attendant framestore for subsequent processing. Because the sizes of photoprints may vary (typically 3R, 4R and 5R sized prints) image projection mechanism 50 includes a magnification/focussing unit 52, preferably an adjustable focus zoom lens 54, so that the photoprint image that is projected on the high resolution sensor 60 may be adjusted, as necessary, to ensure that the digitized image that is written onto a compact disc and played back on a customer's home CD player will be correctly displayed, in focus and filling the screen of a customer's television set.

Now although professional photofinishers employ standardized photoprint sizes, such as the above- mentioned 3R, 4R and 5R sizes, in practice, the actual dimensions of batches of photoprints produced by different photofinishers may vary from one another (e.g. by as much as one-quarter an inch per edge). As a result, employing a fixed magnification default setting for the zoom lens for a given photoprint size will not necessarily guarantee that the photoprint will be properly imaged on the scanner's photosensor. In order to accommodate variations in photoprint dimensions, the zoom lens is adjustable by the photofinisher, who observes the image by way of an auxiliary, relatively low resolution, monochromatic 'preview' display unit to which the output of the scanner's image sensor is coupled. When the photofinisher is satisfied that the image is properly sized (and focussed) within the confines of the preview display screen, scanning and digitizing of the photoprint image as projected onto the image sensor is invoked.

A shortcoming of such photofinisher participation in the scanning of each photoprint is the fact that the preview operation is time consuming and labor intensive, and thereby results in an increased cost per processed print image. Ideally, the zoom lens magnification should be controlled by way of default settings associated with each photoprint size. Unfortunately, however, as noted above, different photoprints of a given size (e.g. 3R) do not necessarily have the same dimensions.

SUMMARY OF THE INVENTION

In accordance with the present invention, the need for the photofinisher to perform a zoom lens adjustment for each photoprint of a given batch of photoprints is obviated by a lens control mechanism through which default settings for zoom lens magnification and focus may be calibrated, as necessary, as a precursor step for processing a plurality of photoprints belonging to a common batch. In particular, the present invention is directed to a lens control mechanism in which, for a given print size, the magnification and focus default settings of the projection system's zoom lens may be readily recalibrated to new values associated with magnification and focus adjustments of the zoom lens through which the photofinisher has optimized the presentation of the photoprint image on a preview display monitor to which the output of the scanner's image sensor is coupled. Thereafter, as additional photoprints of the same size of that batch are processed, the reprogrammed default settings are used without the need for adjustment, so that each photoprint will be properly imaged on the scanner's photosensor.

The lens control mechanism of the present invention is especially useful for automatically scanning a series of platen-mounted photoprints, the platens for which contain machine readable photoprint parameter information (e.g. bar codes or adjustable indicator elements), as described above. As such machine readable information is detected by one or more image parameter sensors located in the platen feed path, the magnification and focus default settings are used to rapidly adjust the image projection system, including zoom and focussing ring positions of the zoom lens, so as to facilitate the automatic processing of a plurality of photoprints of a common batch.

More particularly, the image magnification control mechanism in accordance with the present invention is intended for use with an apparatus, such as the above referenced scanner, which is operative to digitize an image that has been recorded on a photographic recording medium, such as 35 mm film, and stores the digitized image on a digital storage medium, such as an optical compact disc. As noted above, within the projection path of the scanner is an image projection device containing a variable magnification device in the form of an adjustable focus, zoom lens. The projection path is incident upon a photo-responsive device, such as a high resolution CCD sensor, image outputs signals from which are digitized for storage on a compact disc. Control of the operation of the scanner includes the use of a display device to which output signals provided by the photosensor are coupled so as to display the projected image.

Whenever a photoprint is presented to the scanner an indication of the size of the photoprint is provided, as by way of a code stored on a photoprint platen, in order to set the magnification setting of the zoom lens. The photofinisher observes the display of the image projected on the photosensor and adjusts, as necessary, the operation of the zoom lens so that the image displayed by the display device fits the display screen. Using a program feature of a user interface, the photofinisher stores in memory information representative of the adjustment of the zoom lens. Then, for subsequent presentations of photoprints to the scanner, the stored adjustment information is used as a magnification setting default value for a respective photoprint size. Whenever the magnification of the zoom lens is adjusted, there is an accompanying change in the focus ring of the lens, so that the displayed image is maintained in focus, and substantially fills the display area of the display device. To capture a high resolution image (four times that of the resolution of the image sensor), an optical translation dither device is provided which controllably varies the spatial location at which an image projected by the zoom lens device is incident upon the image sensor. A color filter mechanism which contains a plurality of respectively different color filters is rotated so that the filters are sequentially inserted in the path of the projected photoprint image, so that successively selected color components of the projected image are captured, digitized and stored. For those images which have been captured with a camera rotated ninety degrees (vertical images), the user interface includes a vertical button which, when depressed, causes the controller to store information representative of the vertical orientation of the image on the photoprint. This 'vertical' code is stored in a control file on the compact disc so that the image will be displayed upright on playback.

BRIEF DESCRIPTION OF THE DRAWINGS

FIG. 2 is an exterior perspective view, while FIGS. 3 and 4 are diagrammatic respective front and side views of the internal architecture of a dual imaging station, photoprint digitizing scanner described in the above-referenced Parulski et al application;

FIG. 9 shows RESET MODE and SLEEP MODE routines of the control mechanism of the invention;

DETAILED DESCRIPTION

Figure 1:
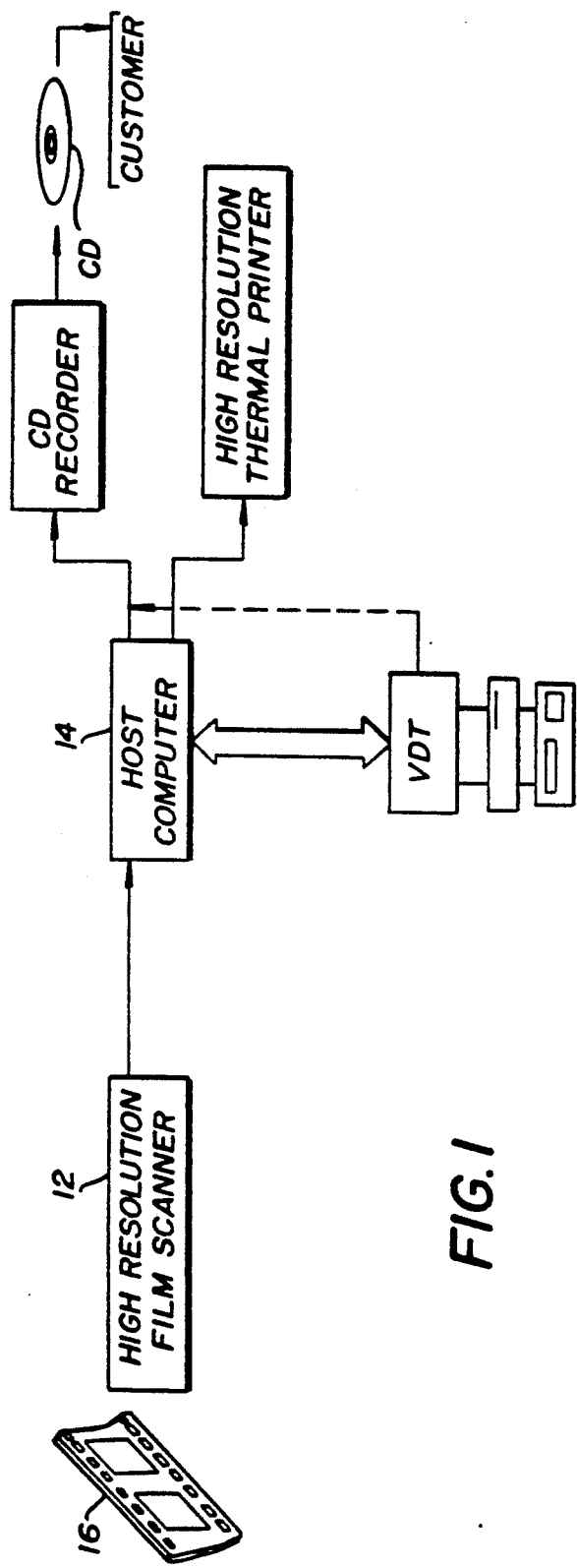
FIG. 1 diagrammatically shows a photo digitizing apparatus described in co-pending U.S. patent application Ser. No. 582,305, filed Sep. 14, 1990, entitled "Multiresolution Digital Imagery Photofinishing System," by S. Kristy.
Figure 2:
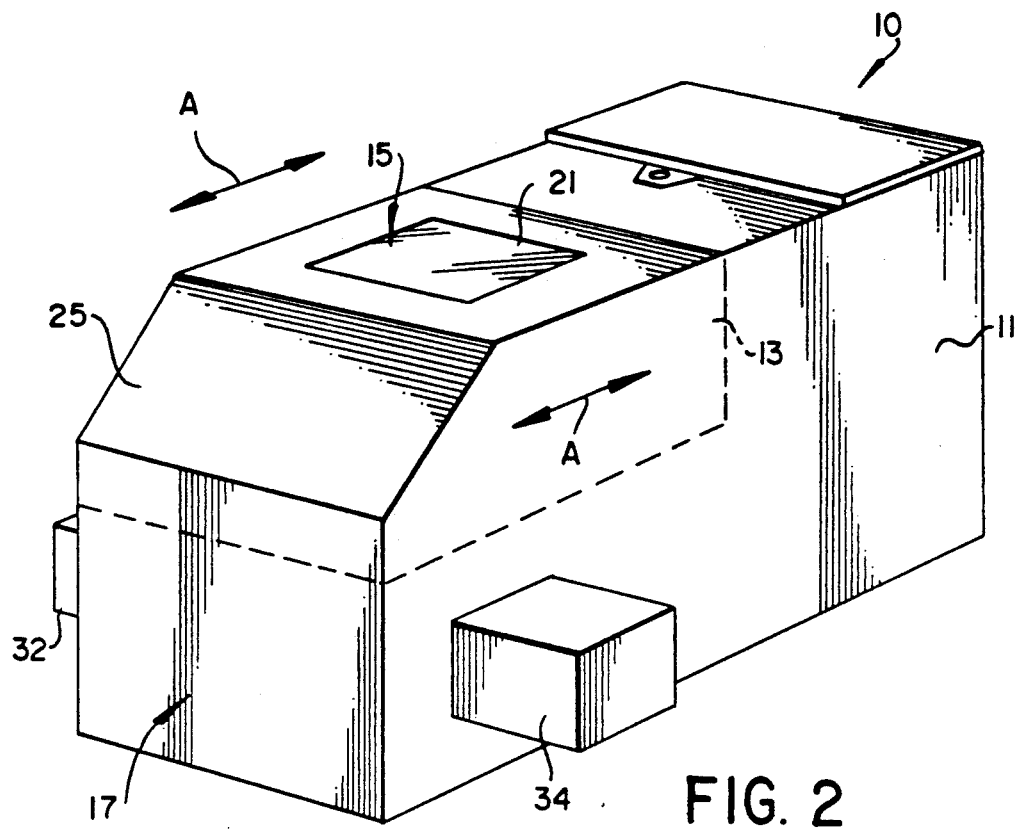
Figure 5:
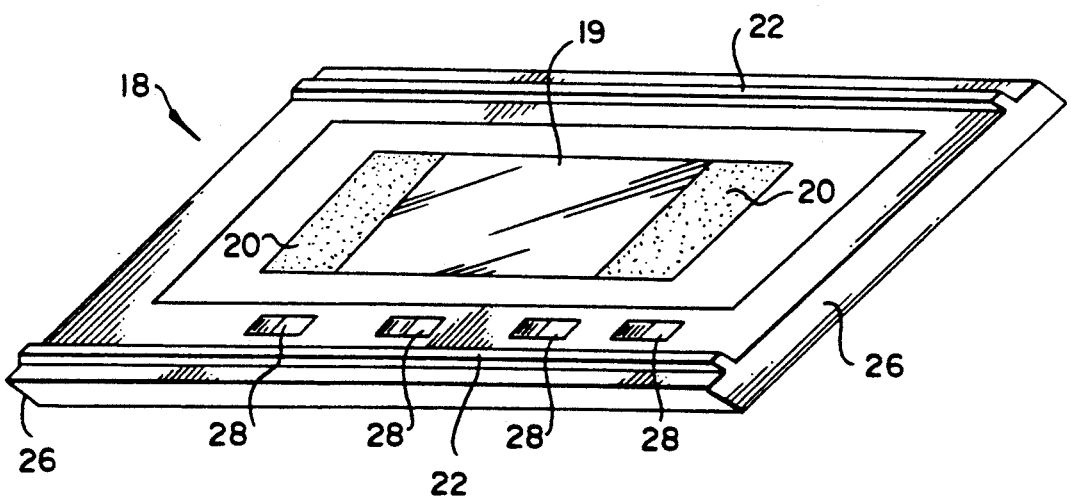
FIG. 5 diagrammatically shows a photoprint-support platen used to feed a photoprint to an imaging station of a photoprint imaging scanner.
Figure 4:
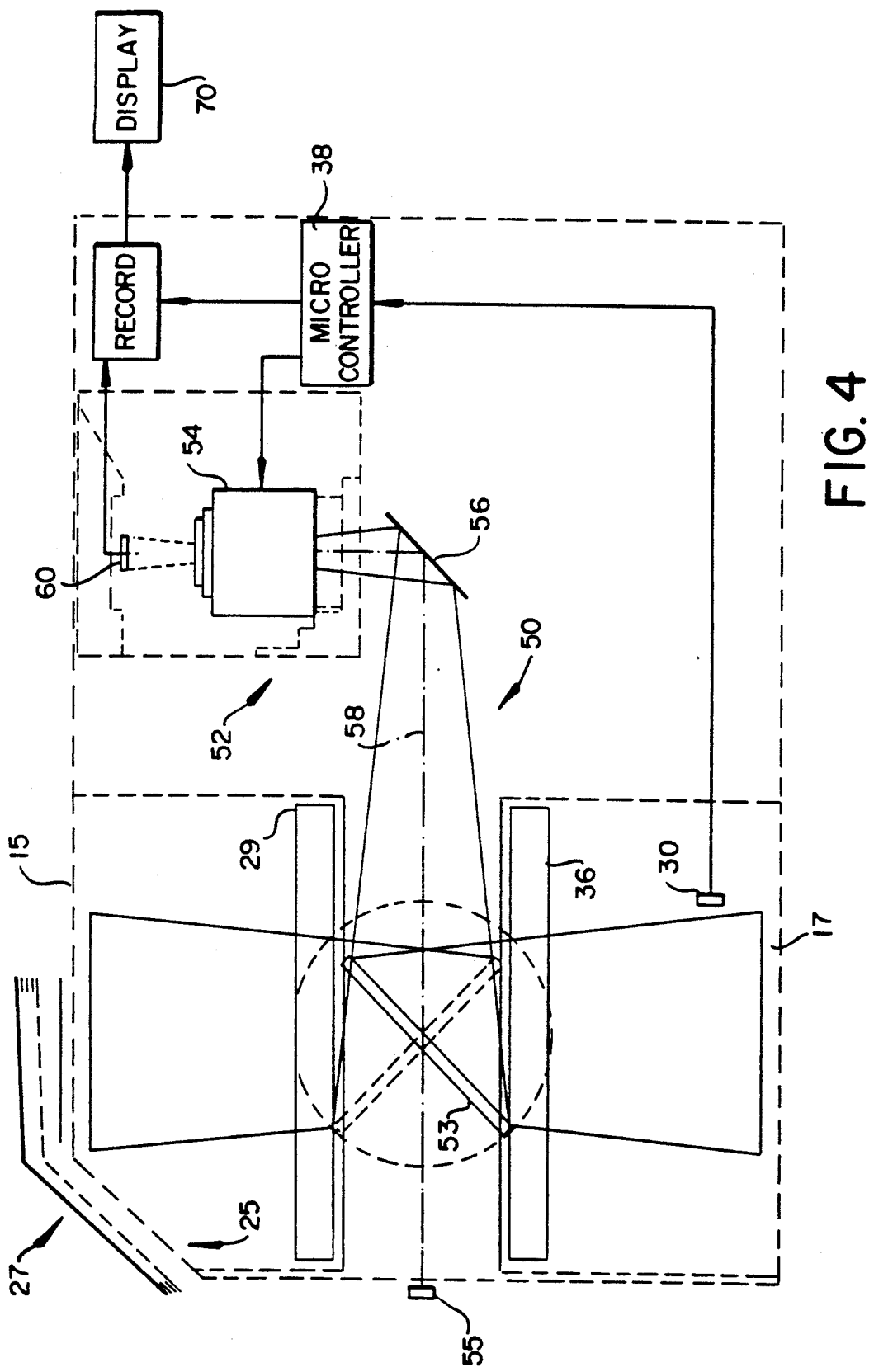

As described previously, the photoprint scanner described in the above-referenced Parulski et al application and illustrated diagrammatically in FIGS. 2, 3 and 4, includes a multi-directional image projection mechanism 50, which is operable to controllably project the image of a photoprint, that has been placed or positioned at a selected one of imaging stations 15, 17, onto a high resolution image sensor 60. Because the sizes of photoprints may vary, image projection mechanism 50 includes an adjustable magnification/focussing unit 52 that preferably contains an adjustable focus zoom lens 54, such as a Nikon 35–70 mm zoom lens.

Figure 6:
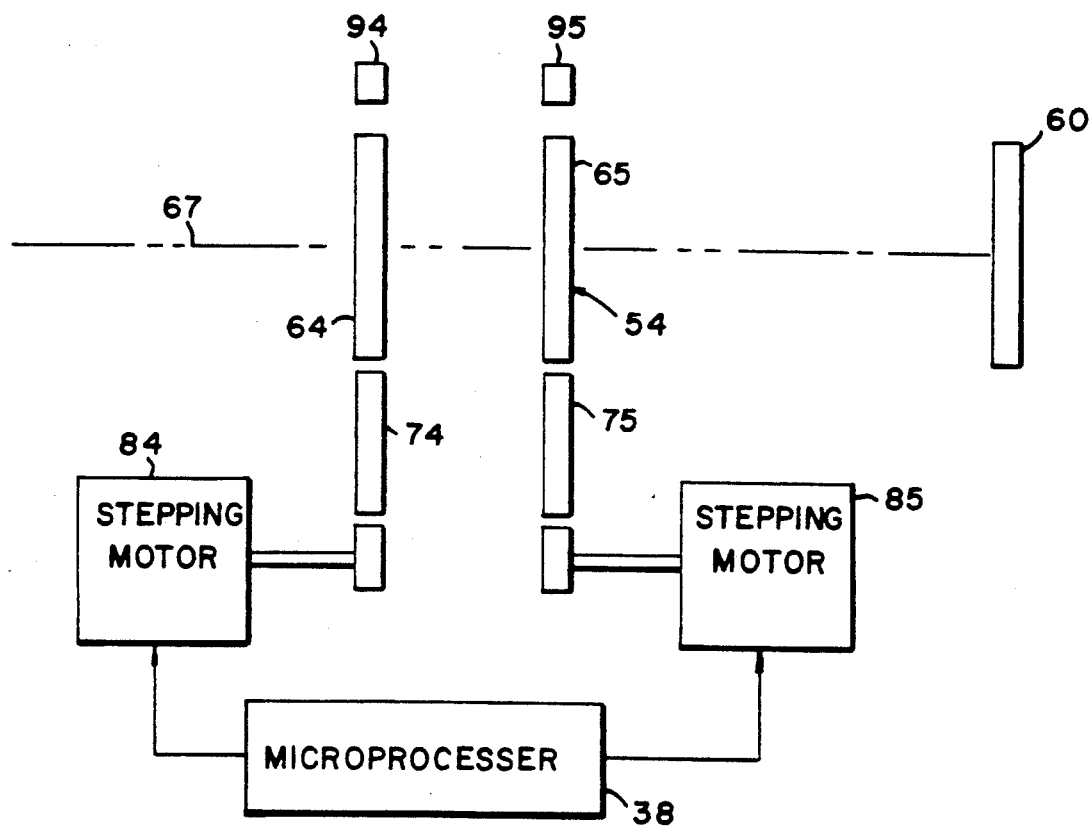
FIG. 6 diagrammatically shows a zoom lens fitted with magnification and focus adjustment rings.

Zoom lens 54 is shown diagrammatically in FIG. 6 as being fitted with magnification and focus adjustment rings in the form of toothed collars 64 and 65, respectively. The collars are mounted so that as they are rotated, they are translated along an image projection axis 67, which intersects (and is normal to) the plane of the scanner's high resolution CCD sensor 60. For this purpose, each lens collar 64 and 65 is coupled either directly or through a suitable linkage (e.g. belt and pulley coupling) 74, 75 to a respective stepper motor 84, 85. The gear ratio and stepper motor resolution are such as to allow fine angular motion of the zoom lens so as to permit fine adjustments in both its magnification and focus settings. Respective 'home' or 'reset' position sensors 94, 95 are arranged along the travel path of lens collars 64, 65 for detecting when the collars have reached prescribed reference positions on axis 67.

Figure 7:
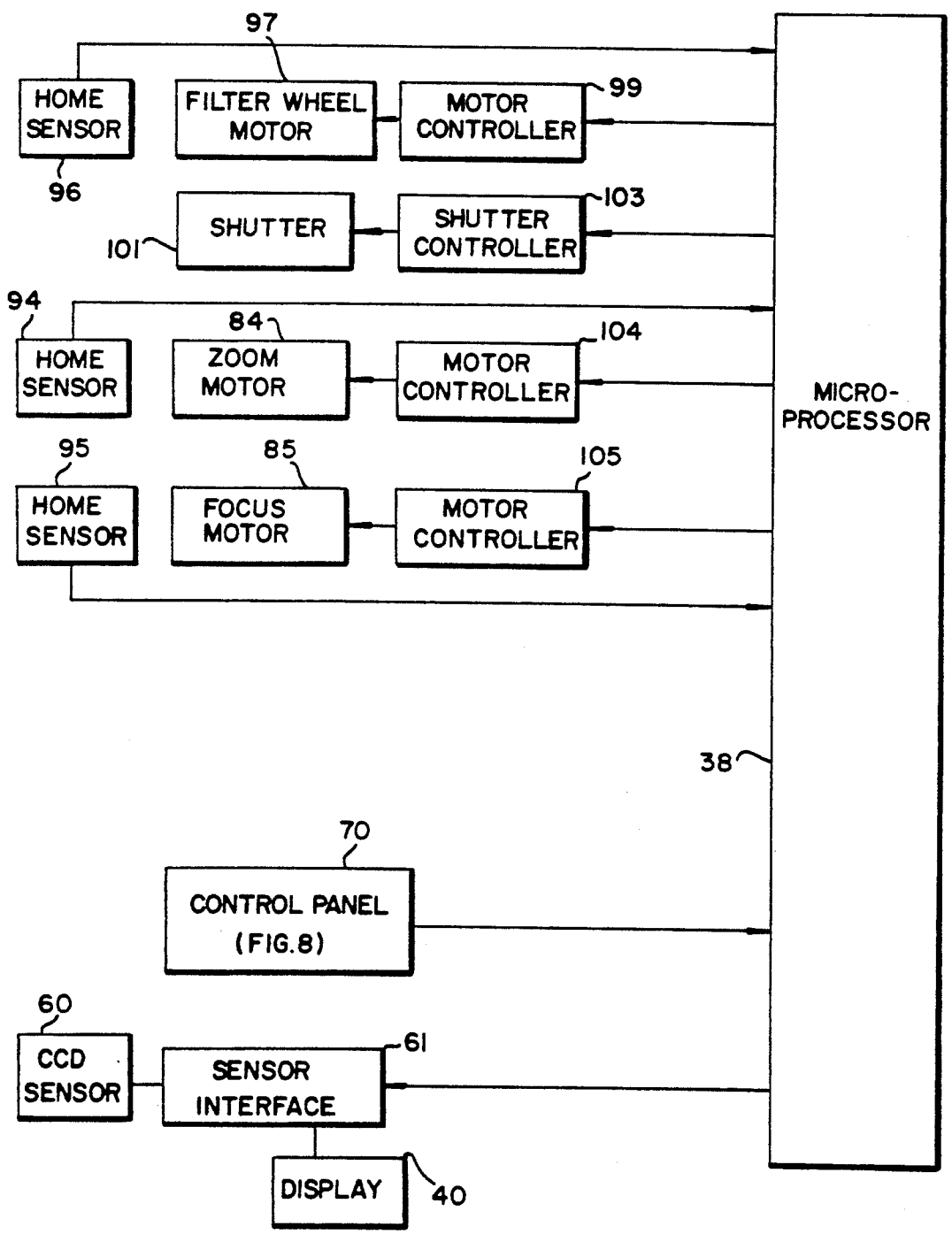
FIG. 7 is a lens control system diagram of FIG. 7.

As illustrated in the lens control system diagram of FIG. 7, stepper motors 84, 85 are controllably driven by associated motor controllers 104, 105 under the control of microcontroller 38, in response to either operator-sourced inputs or platen-sourced parameter data, so as to control the size and position of the photoprint image that is projected and focussed on CCD sensor 60. Also shown in FIG. 7 are the control components for a shutter and an associated filter wheel which control the amount of light and color components of photoprint images projected onto sensor 60, as described in copending U.S. patent application Ser. No. 575,772, filed Aug. 31, 1990, entitled "Color Sequential Scanner Incorporating A Synchronized Variable Exposure Shutter" by K. A. Parulski et al, assigned to the assignee of the present application and the disclosure of which is herein incorporated.

As described in that application, advantage is taken of the improved color balance properties of fluorescent lamps, by synchronizing the exposure time of an electronic shutter 101 (through which respective red, blue and green color images of a photoprint are sequentially captured by high resolution opto-electronic image sensor 60) with the AC power source for the lamps. By using a high resolution image sensor, such as a 1536×1024 pixel CCD image sensor for image sensor 60, and effecting a two dimensional optical translation of the image sensor relative to the projected image makes it possible to realize a 3072×2048 pixel (high resolution) image corresponding to that obtained by the image pixel matrix of a high resolution image color image camera. Such a relative dither may be accomplished by either physically translating the image sensor itself or by translating the projected image.

In accordance with a preferred embodiment of the scanner, the projected image is 'dithered' in the X and Y directions on the image plane of CCD sensor 60 by means of an image dither mechanism in the form of a canted glass plate, which is inserted in the image projection path ahead of sensor 60 and sequentially rotated in ninety degree segments so as to cause successively projected images to fall on (four) respectively adjacent regions of the sensor. Capturing and digitizing the image that falls on each of these adjacent regions makes it possible to realize a 3072×2048 high resolution image output from the CCD image sensor.

For each respective monochromatic image (one of red, green and blue) as determined by a sequentially stepped color filter wheel shown at 97, the output of image sensor 60 is digitized and stored in an associated image framestore of host processor/microcontroller 38. The stored digitized image is then processed by the host image processor for storage on a digital storage medium, such as a compact disc, which may then be delivered to the customer for playback by a CD player and display on a home television set.

Specifically, a multicolor filter wheel 97 is controllably rotated by a motor controller 99 to sequentially insert a respective one of successive red, green and blue filters in the path of the projected image, while the operation of a shutter 101 is controlled by a shutter controller 103 to define the length of time that the photoprint is imaged on sensor 60. Like zoom stepper motor 84 and focus stepper motor 85, filter wheel motor 97 has an associated home or reset sensor 96 which establishes a reference or reset position for the filter. As a non-limitative example, filter wheel 97 may have a home position such that its green filter is disposed in the path of the projected image. This home color is used during the preview display of the photoprint image.

The photoprint image that is focussed on sensor 60 is read out through a sensor interface 61 to microcontroller 38 and to a 'preview' display monitor 40. By observing this 'preview' display, the photofinisher is able to adjust as necessary, via a set of control buttons on a control panel 70 and described below with reference to FIG. 8, the control parameters of image magnification/focussing unit 52, until the previewed image is optimally focussed and geometrically positioned on the display screen. As will be described, when the photofinisher is satisfied that the image is properly displayed, he may depress a 'program' button, which causes the magnification and focus settings for a selected print size to be stored in a default table, so that the control parameters for the zoom lens will be effectively calibrated to that photoprint. Thereafter, for subsequently fed platen-mounted photoprints, the operation of the image magnification/focussing unit is automatically referenced to the newly calibrated default settings, thereby facilitating rapid scanning of a series of platen-mounted photoprints.

As explained above, in order to enable the photofinisher to optimally adjust the projection and focussing parameters of the scanner, such as any required translation of unit 13 and adjustment of zoom lens 54, the output of high resolution CCD image sensor 60 is coupled separately of the high resolution image processing workstation to an auxiliary, lower resolution, monochromatic 'preview' display unit 40. While it is possible to use the high resolution color display terminal of the photofinishing workstation for this purpose, from a practical operational standpoint, the processing time required to display the full color 3072×2048 pixel image is prohibitive. For successful operation of the scanner, what is necessary is that, prior to image capture, the photoprint be correctly positioned, and its image correctly sized and focussed on the image sensor. To satisfy these requirements, during a 'preview' of the image, the photofinisher does not need to view a full color image at its highest resolution; a lower resolution, monochromatic image will do.

In accordance with a preferred embodiment of the invention, in order to rapidly preview what is seen by the CCD image sensor 60 on display 40, sensor output interface 61 preferably includes an auxiliary preview framestore apparatus of the type described in U.S. Pat. No. 5,138,454 entitled "Megapixel Video Previewer Framestore and Display", by K. A. Parulski et al, assigned to the assignee of the present application and the disclosure of which is herein incorporated. As described in that application, the auxiliary preview framestore apparatus includes a pair of 'ping-pong' write-/read memories, the pixel and line rate clocks to the address generators of which are multiplexed, so as to not only permit rapid display of a low resolution version of the photoprint image, but to display the image in a variety of formats for optimizing the manner in which the photoprint may be digitized and stored.

Figure 8:
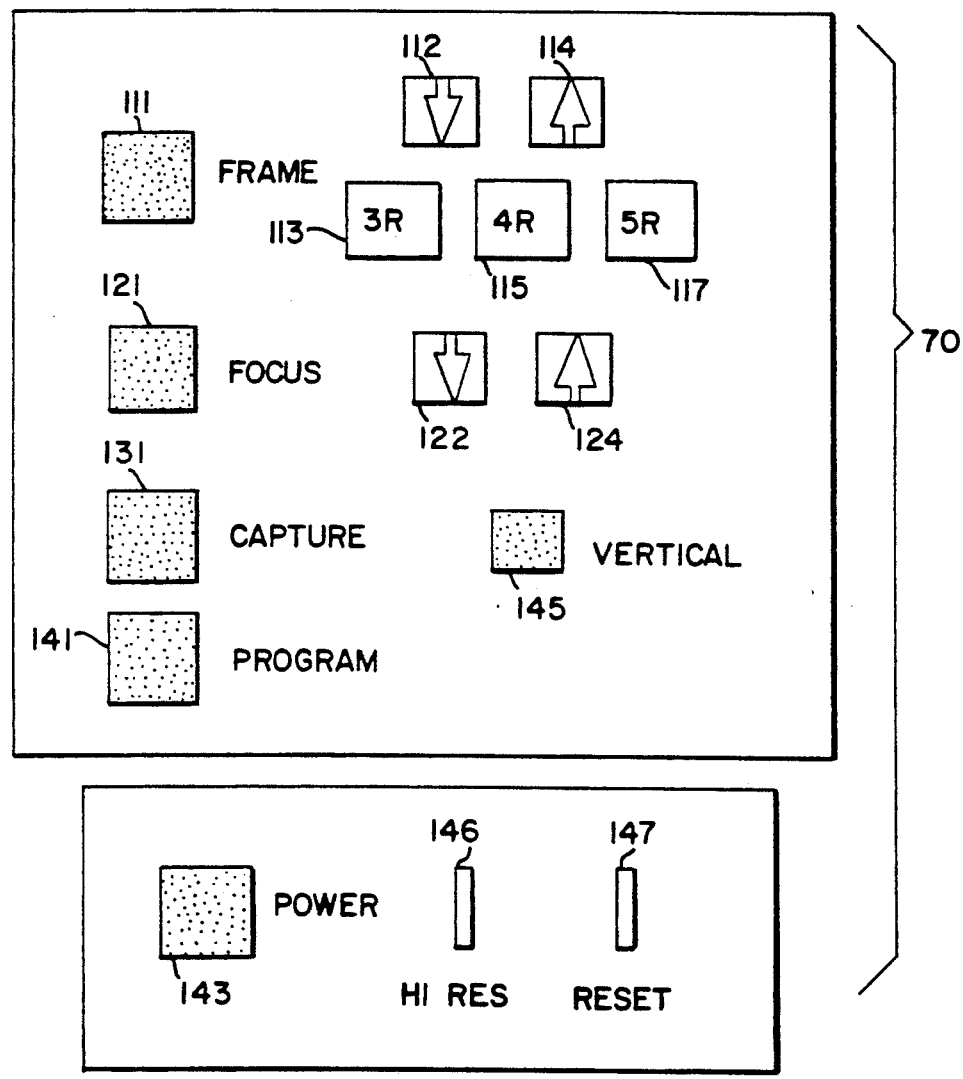
FIG. 8 shows a scanner user interface in the form of a set of control buttons.

Referring now to FIG. 8, a diagrammatic illustration of a user interface mounted on a control panel of the scanner and employed by the photofinisher to adjust photoprint image magnification and focus is shown as comprising a set of control buttons 70. Control buttons 70 are coupled to microcontroller 38 via an input interface to supply user requests which are serviced as interrupts for controlling the operation of the system. As shown in FIG. 8, the control buttons include four mode buttons 111, 121, 131, 141, respectively denoted FRAME, FOCUS, CAPTURE and PROGRAM, through which respective modes of operation of the scanner are initiated.

Associated with the FRAME mode button 111 is a zoom-in button 112, a zoom-out button 114, a set of size buttons 113, 115, 117, respectively associated with prescribed photoprint sizes—3R, 4R and 5R. When the zoom-in button is depressed during FRAME mode, zoom lens 54 is stepwise displaced to increase the magnification of the image projected on image sensor 60 and displayed on 'preview' monitor 40. Conversely, when the zoom-out button is depressed during FRAME mode, zoom lens 54 is stepwise displaced to decreased the magnification of the image. When any of the size buttons 113, 115, 117 is depressed during FRAME mode, zoom lens 54 is displaced in accordance with a default magnification value for the corresponding photoprint size.

Associated with the FOCUS mode button 121 are a focus-in button 122 and a focus-out button 124. When the focus-in button 122 is depressed during FOCUS mode, the focus ring of zoom lens 54 is stepwise displaced in a first direction. Conversely, when the focus-out button 124 is depressed during FOCUS FRAME mode, the focus ring of zoom lens 54 is stepwise displaced in a second, opposite direction.

When the CAPTURE mode is invoked by depressing button 131, filter wheel motor 97 and shutter 101 are operated so as to capture a color high resolution image projected onto photosensor 60. When the PROGRAM mode button 141 is depressed, current settings for the focus and zoom rings of zoom lens 54 are stored as default values for a selected one of size buttons 113, 115, 117.

Also shown in FIG. 8 is a VERTICAL button 145. Depressing this button provides an indication to the microcontroller that the image on the photoprint has a vertical, rather than a conventional horizontal, orientation. This indication is used by the downstream CD recording system to store, as part of an image control file on the disc, a code representative of the fact that the image has a vertical orientation so that on playback it will be displayed upright.

The scanner's user interface also includes an on/off switch, or POWER button 143, a HI RES button 146 used to select whether or not the image is to be captured as a high resolution (HI RES=1) or a low resolution (HI RES=0) image, and a RESET button 147, which resets the system. (RESET=1).

As described above, control buttons 70 are employed by the system operator (photofinisher) to supply user requests which are serviced as interrupts for controlling the operation of the system. The application program employed by microcontroller 38 to initiate service for any pushbutton request contains a module or interrupt service routine denoted as hsio_isr(). In the description to follow, the sequence of operations carried out by this embedded control mechanism will be described with reference to FIGS. 9-14, which show flow among the respective modes of operation of the system, all of which may be invoked manually by the operator and some of which are invocable automatically in accordance with photoprint image parameter information contained on one or more machine readable regions on a platen.

RESET AND SLEEP MODES (FIG. 9)

As shown in FIG. 9, which depicts both RESET MODE and SLEEP MODE routines, upon system power up or reset, a first STEP 151 is performed, whereby various components of the scanner assume prescribed home or reset conditions, including the placement of filter wheel 97 to a 'green' position that inserts the green filter into the projected image path, and the movement of the dither mechanism to a first of its four possible orientations, denoted dither position 1. The routine then proceeds to FRAME MODE, shown in FIG. 10.

Also shown in FIG. 9 is a SLEEP MODE, which is used to inhibit the generation of pulse signals for sensor operation. If a prescribed period of time elapses without the operator pushing one of the buttons on the control panel, this mode is invoked and the FRAME, FOCUS AND CAPTURE buttons are illuminated; in addition the shutter is placed in its closed position, as shown in STEP 153. The system remains in the SLEEP mode until one of the buttons is pushed (=1), whereupon the routine proceeds to the mode associated with that button.

FRAME MODE (FIG. 10)

Figure 10:
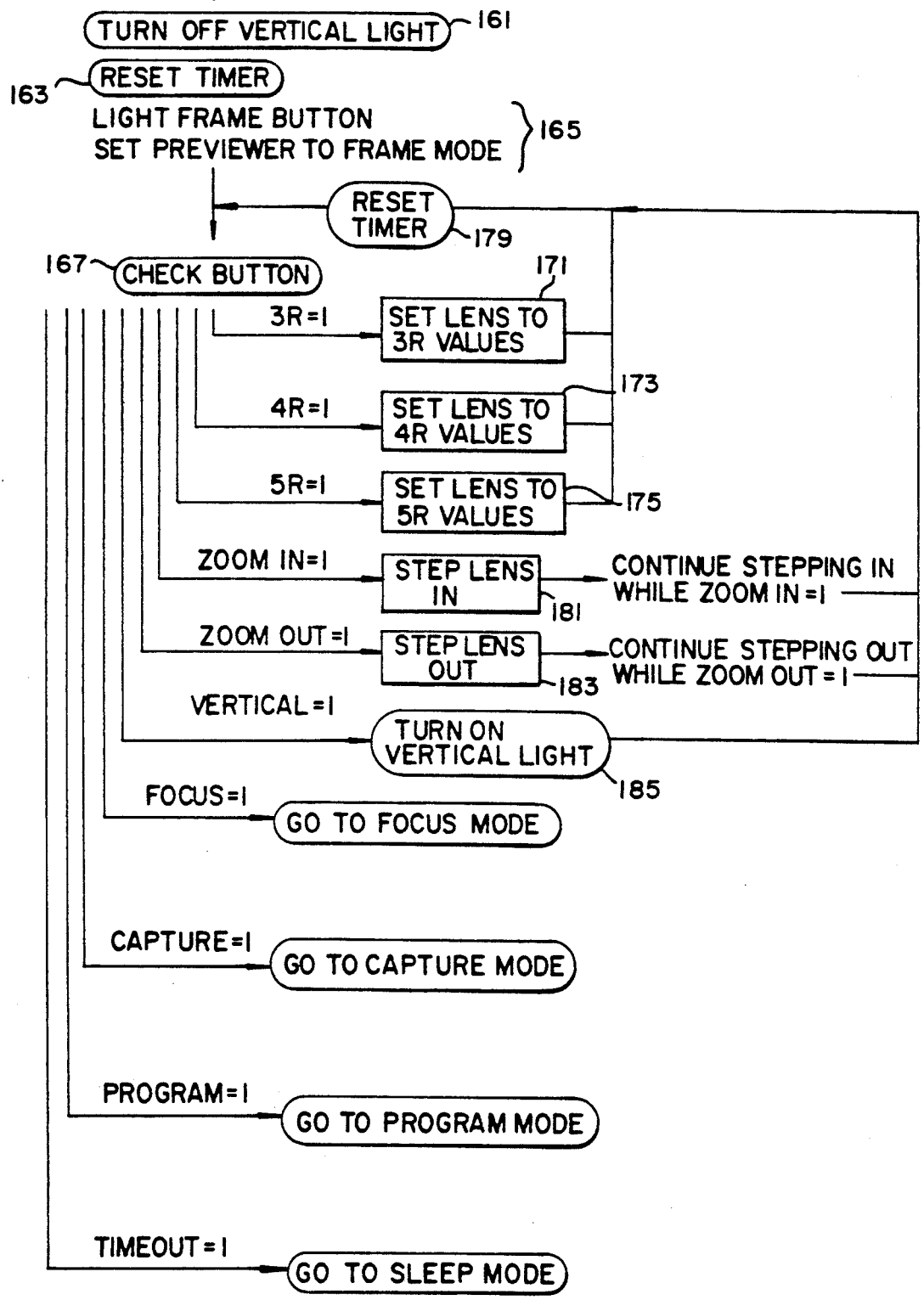
FIG. 10 shows the operational flow through the FRAME mode routine of the control mechanism of the invention.

FIG. 10 shows the operational flow through the FRAME mode, which is the basic routine through which the scanner operator adjusts the zoom lens to optimize the photoprint image for capture and digitized storage. When this mode is invoked, as upon system power up (POWER=1), or by pushing the frame button 111 when the system is in SLEEP mode, a light through which vertical button 145 is illuminated is turned off (STEP 161) and a software timer associated with invoking the SLEEP mode is reset (STEP 163). In STEP 165 the FRAME button is illuminated and the preview display is set to a low resolution frame mode for viewing a monochromatic (green filter inserted) photoprint image. The routine then proceeds to determine which, if any of the buttons on the control panel has been pushed.

Typically the photofinisher will initially push one of the size buttons 113, 115, 117 which causes zoom lens 54 to be rapidly translated to whatever 3R magnification default value is currently stored in memory, as denoted by respective STEPs 171, 173 175. When the zoom lens has been moved to the selected default magnification position, the softimer is reset (STEP 179) and the routine proceeds again to STEP 167.

For purposes of the present description it will be assumed that the image on the preview display requires magnification adjustment. In this case, the scanner operator pushes zoom-in, zoom-out buttons 112, 114, as necessary, to cause zoom lens stepper motor 84 to incrementally adjust the position of zoom lens 54 (STEPS 181, 183). Thus, through the operation of the size and zoom adjust buttons, the operator controls the degree of magnification of the projected and displayed image.

Figure 13:
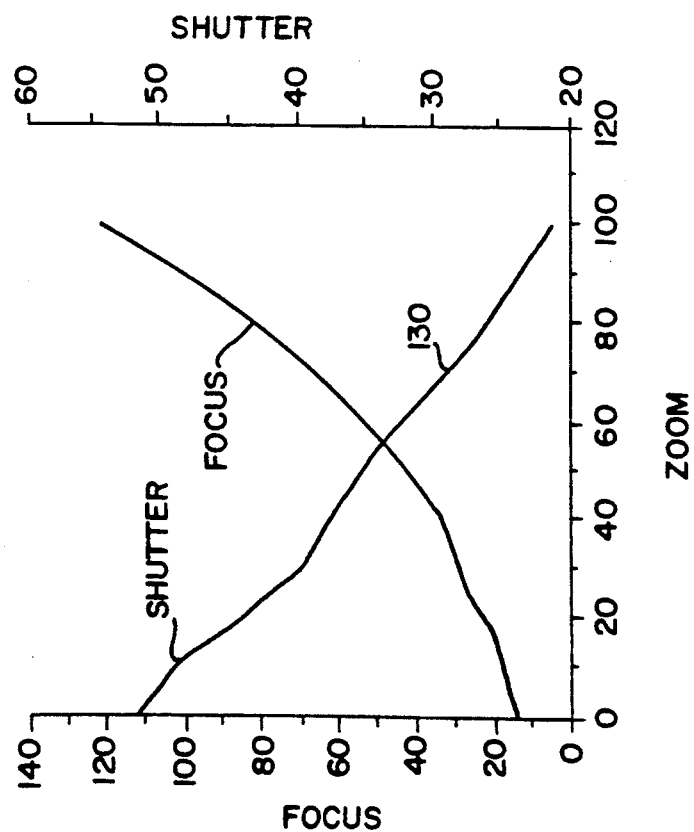
FIG. 13 shows such an empirically determined characteristic stored in a focus adjustment look-up table for adjusting the focus of the zoom lens as its magnification setting is changed.

Whenever the setting of the zoom lens is changed, an adjustment of the focus ring is required in order to maintain the image in focus on image sensor 60. The focus adjustment required is an approximately linear function of the zoom lens setting and may be derived empirically. FIG. 13 shows such an empirically determined characteristic 130, which is preferably stored in a focus adjustment look-up table and is used by microcontroller 38 to adjust the focus of the zoom lens as its magnification setting is changed.

If the image on the photoprint was captured with the camera rotated 90 degrees (vertically oriented), the operator pushes VERTICAL button 145, causing that button to be illuminated (STEP 185), so that microcontroller will store a code representative of the fact that the image has a vertical orientation, to ensure correct orientation on playback, as explained previously.

FOCUS MODE (FIG. 11)

Figure 11:
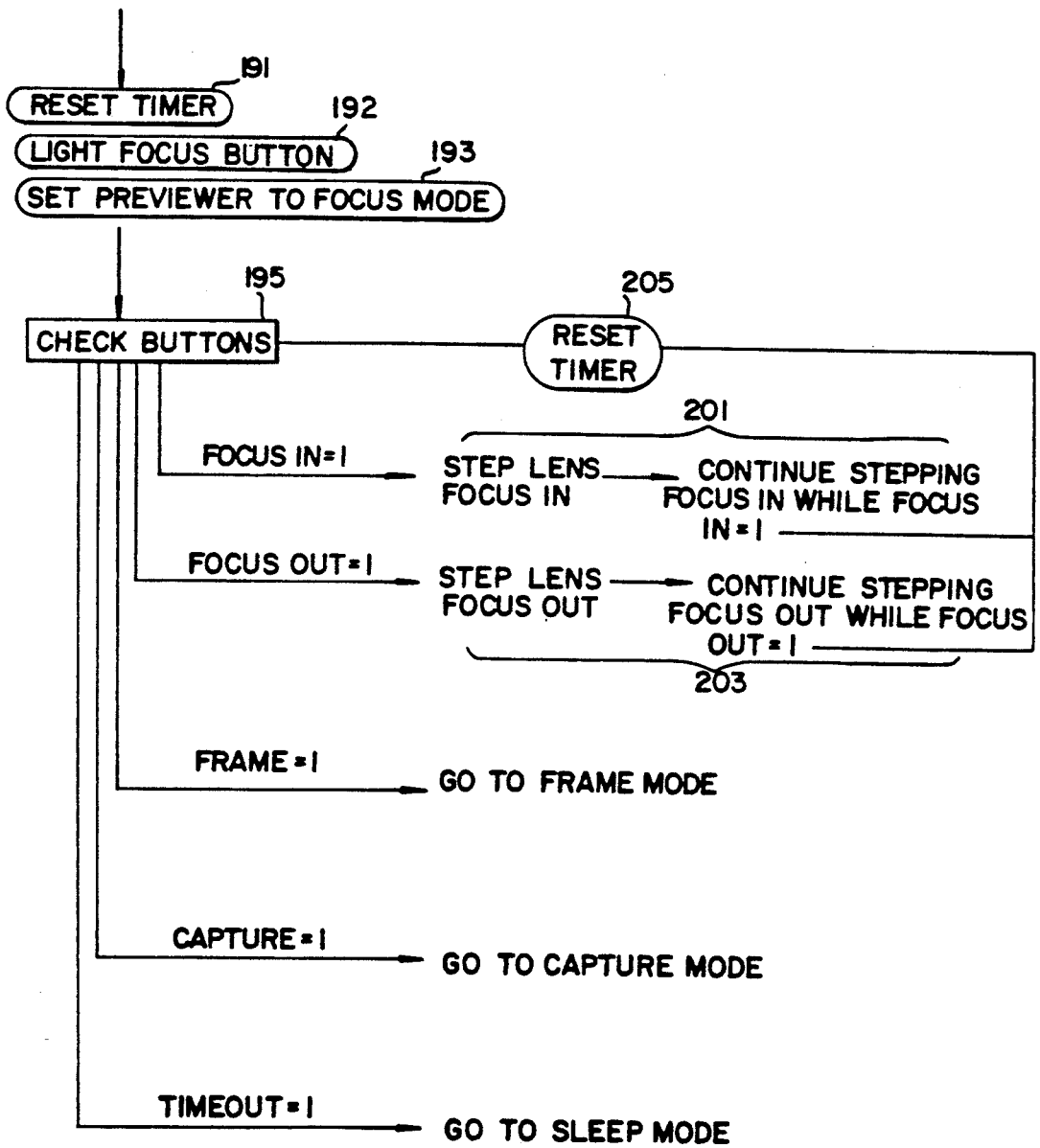
FIG. 11 shows the operational flow through the FOCUS mode routine of the control mechanism of the invention.

To control the focus, the scanner operator pushes the FOCUS button 121 (FOCUS=1), causing the FOCUS mode routine of FIG. 11 to be invoked. Again, the software timer is reset (STEP 191), the FOCUS button 121 is illuminated (STEP 192) and STEP 193 causes a control signal to be coupled to the above-referenced auxiliary preview framestore apparatus. This control signal is used to modify the frame store read out operation, so that only a prescribed region (a center portion) of the preview display to be updated as the focus is changed.

As in the FRAME mode, in STEP 195, the FOCUS mode routine determines which of focus-in or focus-out buttons 122, 124 has been pushed. In response to whatever of these buttons is pushed by the photofinisher (STEPS 201, 203), focussing ring 65 will be stepwise adjusted each time the button is depressed. After focus adjustment, the routine proceeds to reset the software timer (STEP 205) and returns to STEP 195.

CAPTURE MODE (FIG. 12)

Figure 12:
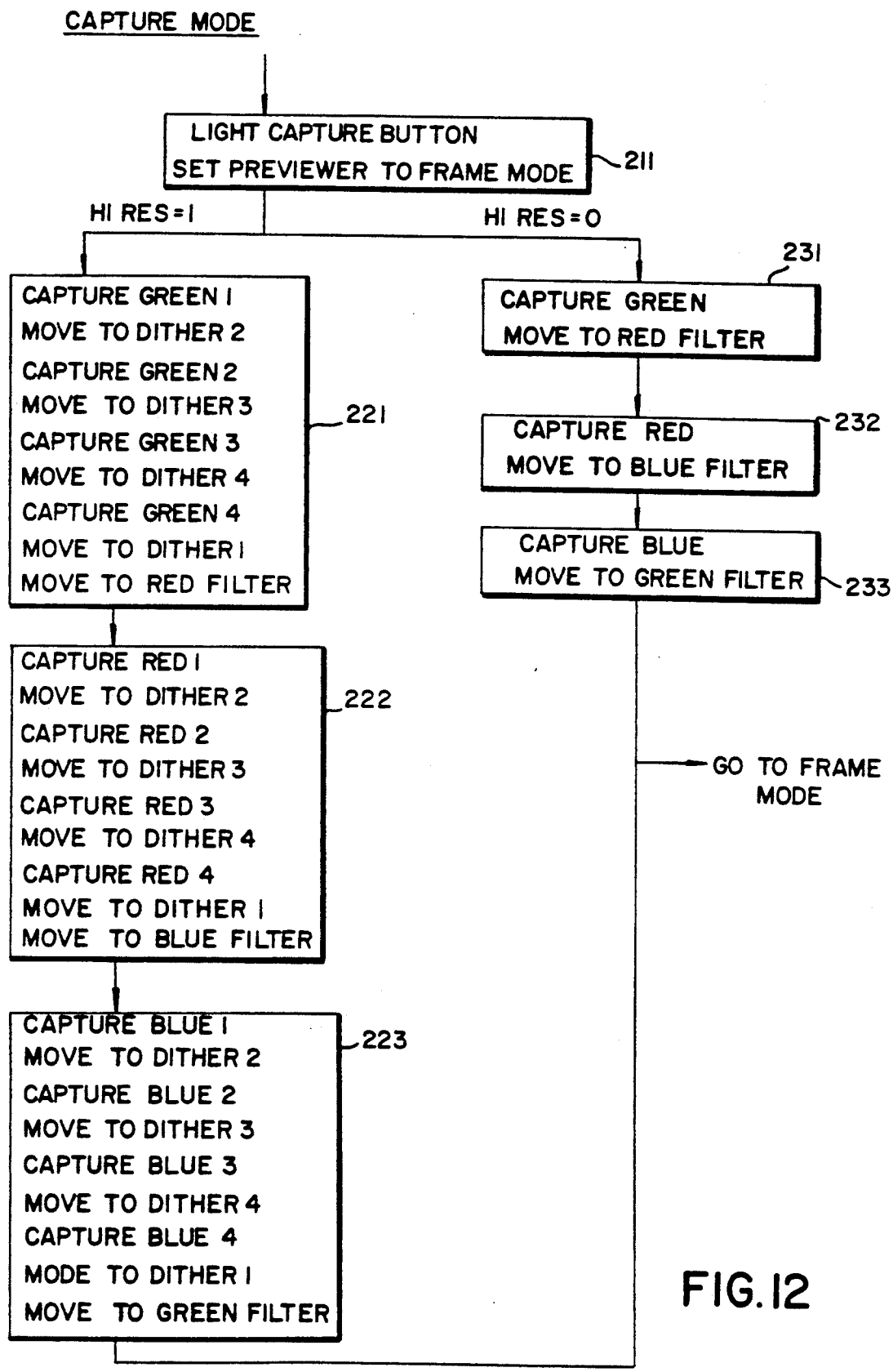
FIG. 12 shows the operational flow through the CAPTURE mode routine of the control mechanism of the invention.
Figure 14:
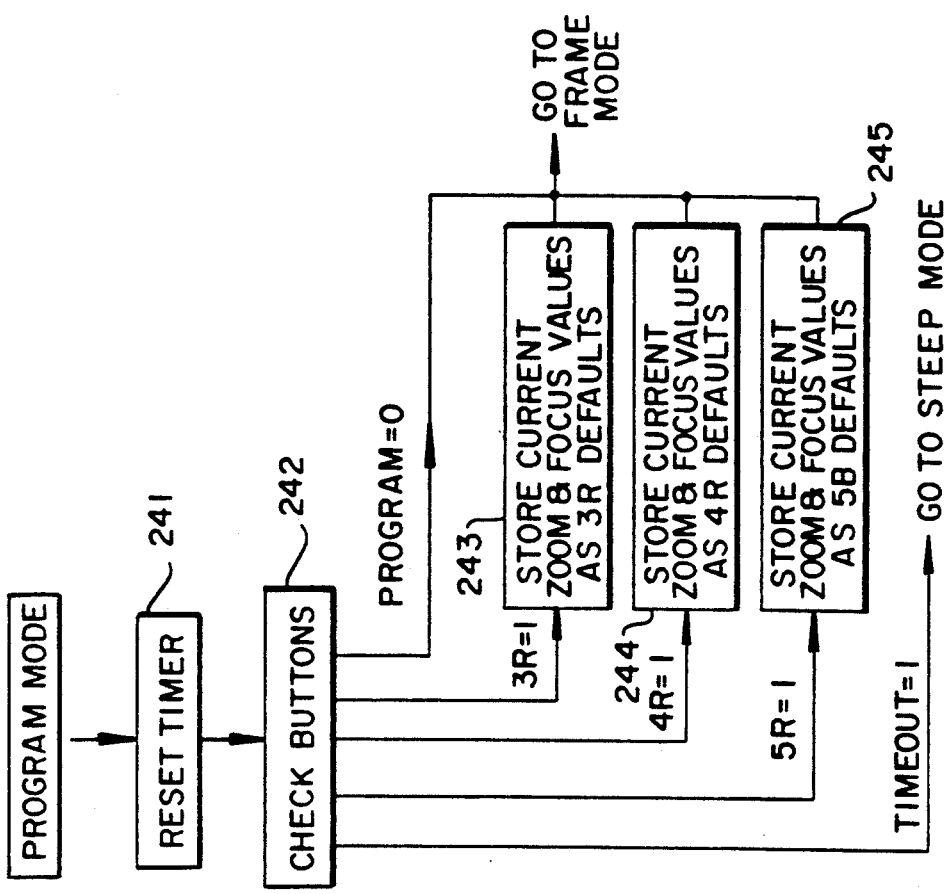
FIG. 14 shows the operational flow through the PROGRAM mode routine of the control mechanism of the invention.

Next, it will be assumed that the scanner operator pushes the CAPTURE button 131 (CAPTURE=1), so that the operation proceeds to the CAPTURE mode routine shown in FIG. 12. In the initial STEP 211, the CAPTURE mode button 131 is illuminated and a control signal is coupled to the auxiliary preview framestore apparatus, to place the preview display in the frame mode, described previously. When the HIGH RESOLUTION button 146 has been depressed (HI RES=1), the image capture routine stepwise rotates the dither plate through all four positions for each of the green, red and blue color components, as shown in STEPs 221, 222 and 223, so as to image three successive high resolution images of the photoprint, each of a respectively different color, on sensor 60. For low resolution image capture (the HIGH RESOLUTION button 146 has not been depressed (HI RES=0)), the dither plate is not stepped through its four positions. Instead, the filter wheel is rotated through each of the green, red and blue color components, as shown in STEPs 231, 232 and 233, so as to image three successive low resolution images of the photoprint, each of a respectively different color, on sensor 60. Upon completion of image capture, either of Steps 223 or 233, the routine proceeds to FRAME mode (FIG. 10).

Depending upon which color filter is placed in the path of the projected image by the stepwise operation of color wheel 97, the amount of light incident on the sensor array will vary, so that the shutter speed must be varied accordingly. For this purpose, preset shutter speed values associated with the respective filter colors, are employed. Shutter speed is also dependent upon the magnification setting of the zoom lens. To accommodate these dependency variations a shutter speed look-up table, such as shown in FIG. 13, may be empirically developed and stored in memory. Then during image capture, the shutter speed for a particular filter wheel color is modified in accordance with the look-up table value for the magnification setting of the zoom lens.

PROGRAM MODE (FIG. 14)

As pointed out previously, a particularly useful feature of the present invention is its default setting adjustability, which significantly reduces the workload on the photofinisher by obviating his need to perform a zoom lens adjustment for each photoprint of a given batch of photoprints. Adjusting the default setting of the zoom lens is readily accomplished by means of PROGRAM button 141 which initiates the PROGRAM routine shown in FIG. 14.

When the scanner operator (photofinisher) pushes the PROGRAM button 141 (PROGRAM=1), in either the FOCUS mode or the FRAME mode, the software timer is reset (STEP 241). The routine then proceeds to STEP 242 to check which of the size buttons 113, 115, 117 has been pushed, indicating for which photoprint size, the current default values for the magnification and focus settings are to be replaced. For the selected photoprint size (e.g. 3R=1), its zoom lens default values are replaced, in one of STEPS 243, 244, 245, by those values which represent the positions of the zoom and focus rings as adjusted by the photofinisher by operation of the zoom-in, zoom-out, focus-in and focus-out buttons, as described above for the FRAME and FOCUS modes. Once the new default values have been stored, the routine proceeds to the FRAME mode. (For each of the FRAME, FOCUS, and PROGRAM modes, if no lens adjustment button or size button is pressed by the scanner operator within the period of the prescribed time out, the TIMEOUT bit will be set to a value of "1", thereby invoking the SLEEP mode, described previously.

While adjustment of the image projection optics may be carried out for photoprints positioned at either the upper imaging station or the platen feed station, its principal benefit is obtained for platen-mounted photoprints which are fed to the platen feed station, where image parameter data codes on the platens are read by the microcontroller for automatic magnification control. Where the photoprint is placed in a face-down condition on top plate 21, the translatable unit 13 is positioned as necessary to locate upper imaging station 15 such that the photoprint is transported to an optimum viewing position, as displayed by 'preview' display 40. The operator then controls the image magnification/focussing unit 52 until the displayed image of the photoprint is satisfactory. The image is then scanned by scanning unit 60, and the resulting digitized high resolution color image of the photoprint is stored in an attendant framestore.

On the other hand, platen imaging station 17 is used to automatically digitize a plurality of photoprints that are mounted to respective ones of a stack of platens fed in sequence from a supply magazine 32. As each platen is fed to the platen imaging station, the image parameter data, such as photoprint size (e.g. 3R, 4R, 5R), contained in machine readable regions on the platens is detected by one or more image parameter sensors and coupled to microcontroller 38.

On the basis of this image parameter data, microcontroller 38 controls adjustable image magnification unit 54, so as to adjust the size and focus of the image in accordance on the photoprint that is projected onto image sensor 60. The photoprint image that is focussed on the image sensor is, in turn, coupled to the 'preview' display 40. As explained above, by observing the 'preview' display, the photofinisher adjusts as necessary the control parameters of the image magnification/focussing unit, until the previewed image is focussed and correctly geometrically positioned on the display screen. Any adjustment of these control parameters is stored in the default look-up table, so that the control parameters for the image magnification/focussing unit are now effectively calibrated to a particular sized photoprint. Thereafter, for subsequently fed platen-mounted photoprints of that size, the operation of the image magnification/focussing unit projection device is automatically referenced to the newly calibrated parameter settings, thereby facilitating rapid scanning of a series of platen-mounted photoprints.

As will be appreciated from the foregoing description, the need for a photofinisher to perform a zoom lens adjustment of a digitizing scanner for each photoprint of a given batch of photoprints is obviated by a lens control mechanism through which default settings for zoom lens magnification and focus may be calibrated, as necessary, as a precursor step for processing a plurality of photoprints belonging to a common batch. Thereafter, as additional photoprints of the same size of that batch are processed, the reprogrammed default settings are used without the need for adjustment, so that each photoprint will be properly imaged on the scanner's photosensor.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of controlling the operation of an image projection apparatus which is operative to project an image onto an image receiving region, in which a prescribed attribute of said image is adjustable to a plurality of attribute settings, comprising the steps of:
   (a) storing respective default values for respective ones of said plurality of attribute settings;
   (b) causing said image projection apparatus to project an image onto said image receiving region;
   (c) adjusting at least one operational parameter of said image projection apparatus and thereby causing said image projection apparatus to adjust at least one characteristic of the image projected on said image receiving region in step (b); and
   (d) storing operational control values employed by said image projection apparatus to project the image adjusted by step (c) as default values for a selected one of said plurality of attribute settings.

2. A method according to claim 1, wherein said prescribed attribute corresponds to the magnification of said image on said image receiving region.

3. A method according to claim 2, wherein step (c) comprises adjusting the magnification of said image by said image projection apparatus.

4. A method according to claim 3, wherein step (c) includes adjusting the focus of said image on said image receiving region.

5. A method according to claim 3, wherein step (c) comprises adjusting, as necessary, the focus of said image with the adjusting of the magnification of said image, so as to maintain the projected image in focus on said image receiving region.

6. A method according to claim 3, wherein step (b) comprises causing said image projection apparatus to project an image onto said image receiving region in accordance with a selected one of said magnification default values.

7. A method according to claim 6, wherein step (c) includes adjusting the focus of the image projected on said image receiving region.

8. A method according to claim 6, wherein step (c) comprises adjusting, as necessary, the focus of said image with the adjusting of the magnification of said image, so as to maintain the projected image in focus on said image receiving region.

9. A method according to claim 1, wherein said projection apparatus further includes an image capture device coupled with said image receiving region and controllably operative to capture an image projected onto said image receiving region, and wherein said method further includes the step of (e) causing said image capture device to capture an image projected onto said image receiving region.

10. A method according to claim 9, wherein step (e) comprises
   (e1) causing said image projection apparatus to project said image onto said image receiving region in accordance with the operational control values stored in step (d), and
   (e2) causing said image capture device to capture the image projected onto said image receiving device in step (e1).

11. A method according to claim 2, wherein said image projection apparatus includes a zoom lens device through which the magnification of said image on said image receiving region is adjustable and wherein step (c) comprises adjusting said zoom lens device so as to adjust the magnification of said image on said image receiving region.

12. A method according to claim 11, wherein the focus of said zoom lens device is adjustable, and wherein step (c) comprises adjusting, as necessary, the focus of said zoom lens device with the adjustment of the magnification of said image provided thereby, so as to maintain the projected image in focus on said image receiving region.

13. A method according to claim 12, wherein the plurality of default magnification settings of said zoom lens include settings respectively associated with 3R, 4R and 5R photoprint image sizes.

14. A method according to claim 11, wherein said projection apparatus further includes an image capture device coupled with said image receiving region and controllably operative to capture an image projected onto said image receiving region, and wherein said method further includes the step of (e) causing said image capture device to capture an image projected onto said image receiving region by said zoom lens device.

15. A method according to claim 14, wherein step (e) comprises (e1) setting the magnification and focus parameters of the zoom lens device in accordance with default values stored in step (d), and (e2) causing said image capture device to capture the image projected onto said image receiving region by said zoom lens device.

16. A method according to claim 15, wherein said image capture device includes an image sensor and an image storage device coupled thereto, wherein step (e2) includes controllably varying the spatial location at which an image projected by said zoom lens device is incident upon said image sensor and, for each location, storing the incident image in said image storage device.

17. A method according to claim 16, wherein step (e2) comprises storing a selected color component of the projected image and wherein step (e2) is repeated for successively different color components of said image.

18. A method according to claim 17, wherein said apparatus includes a color filter mechanism containing a plurality of respectively different color filters that are sequentially insertable in the path of said projected image, and wherein step (e2) is repeated in association with the insertion of successive ones of said respectively different color filters in the path of said projected image.

19. A method according to claim 18, wherein step (e2) is carried out for respective red, green and blue color components of said image.

20. A method according to claim 9, wherein step (e) includes the step of storing information representative of the orientation of said image on said image receiving region.

21. For use with an apparatus for digitizing an image that has been recorded on a photographic recording medium and storing the digitized image on a digital storage medium, said apparatus including an image projection device and a photo-responsive device upon which an image on said photographic recording medium is projected by said image projection device, said photo-responsive device providing output signals representative of the image projected thereon, said output signals being digitized for storage on said digital storage medium, said apparatus further including a display device to which output signals provided by said photo-responsive device are coupled so as to display the projected image, a method of controlling the operation of said image projection device so as to control the manner in which an image on said photographic recording medium is projected upon said photo-responsive device comprising the steps of:

a) in the course of presenting a photographic recording medium to said apparatus for digitizing the image thereon, providing an indication of the size of the image;

b) causing said image projection device to project an image presented in step (a) upon said photoresponsive device in accordance with the size indication provided in step (a);

c) observing a display of the image projected on said photo-responsive device in accordance with step (c) and adjusting, as necessary, the operation of said image projection device so that the image displayed by said image display device has a prescribed size;

d) storing information representative of the adjustment of the operation of said image projection device in step (c); and e) for subsequent presentations of photographic recording media to said apparatus in accordance with step (a), causing said image projection device to project an image in step (b) in accordance with the adjustment information stored in step (d).

22. A method according to claim 21, wherein said image projection device comprises an adjustable lens device, and wherein step (c) includes adjusting the operation of said adjustable lens device so that the image displayed by said image display device is displayed in focus on said display device.

23. A method according to claim 21, wherein said image projection device comprises an adjustable focus zoom lens device and wherein step (c) includes adjusting the focus and magnification of said zoom lens device so that the displayed image is displayed in focus and substantially fills the display area of said display device.

24. An apparatus for controlling the projection of an image that has been recorded on a photographic recording medium onto a photoresponsive device, said photoresponsive device providing output signals representative of the image projected thereon, said output signals being coupled to a display device so as to display the projected image, said apparatus comprising:

a controllable magnification, image projection device which is operative to controllably project an image on said photographic recording medium onto said photoresponsive device;

a projection device controller which is operative to control the operation of said image projection device so as to cause said image projection device to project an image on said photographic recording medium onto said photo-responsive device in accordance with information representative of the size of said image as recorded on said photographic recording medium, said projection device controller being operative to adjust, as necessary, the operation of said image projection device so that the image displayed by said image display device has a prescribed size;

a storage device which is controllably operative to store information representative of the adjustment of the operation of said image projection device; and wherein said projection device controller is coupled to said storage device to access therefrom, for subsequent presentations of photographic recording media to said apparatus, adjustment information stored in said storage device, and to control the operation of said projection device in accordance with said accessed adjustment information.

25. An apparatus according to claim 24, wherein said image projection device comprises an adjustable focus, zoom lens, and wherein said projection device controller is operative to adjust the operation of said zoom adjustable lens so that the image displayed by said image display device is displayed in focus on said display device and substantially fills the display area of said display device.

26. An apparatus according to claim 25, wherein the output of said photo-responsive device is coupled to an image signal digitizing device which is operative to convert said output signals into digital format for storage into a digital image database.

27. An apparatus for controlling the operation of an image projection device which is operative to project an image onto an image receiving region, in which a prescribed attribute of said image is adjustable to a plurality of attribute settings, comprising: a storage device which is operative to store respective default values for respective ones of said plurality of attribute settings;
   a projection device controller which is operative to cause said image projection device to project an image onto said image receiving region;
   a control mechanism for adjusting at least one operational parameter of said image projection device and thereby causing said image projection device to adjust at least one characteristic of the image projected on said image receiving region; and
   wherein said control mechanism is controllably operative to cause said storage device to store operational control values employed by said image projection device to project the adjusted image as default values for a selected one of said plurality of attribute settings.

28. An apparatus according to claim 27, wherein said prescribed attribute corresponds to the magnification of said image on said image receiving region and said projection device controller is operative to adjust the magnification of said image by said image projection device.

29. An apparatus according to claim 28, wherein said projection device controller is operative to adjust the focus of said image, so as to maintain the projected image in focus on said image receiving region.

30. An apparatus according to claim 28, wherein said projection device controller is operative to cause said image projection device to project an image onto said image receiving region in accordance with a selected one of a plurality of magnification default values.

31. An apparatus according to claim 27, further including an image capture device coupled with said image receiving region and controllably operative to capture an image projected onto said image receiving region.

32. An apparatus according to claim 31, wherein said controller is operative to cause said image projection device to project said image onto said image receiving region in accordance with the operational control values stored in said storage device and to cause said image capture device to capture the image projected onto said image receiving device.

33. An apparatus according to claim 28, wherein said image projection device includes a zoom lens through which the magnification of said image on said image receiving region is adjustable and wherein said controller is operative to adjust said zoom lens so as to adjust the magnification of said image on said image receiving region.

34. An apparatus according to claim 33, wherein the focus of said zoom lens is adjustable, and wherein said a controller is operative to adjust, as necessary, the focus of said zoom lens with the adjustment of the magnification of said image provided thereby, so as to maintain the projected image in focus on said image receiving region.

35. An apparatus according to claim 34, wherein the plurality of default magnification settings of said zoom lens include settings respectively associated with 3R, 4R and 5R photoprint image sizes.

36. An apparatus method according to claim 32, further including an image capture device coupled with said image receiving region and which is controllably operative to capture an image projected onto said image receiving region, and wherein said controller is operative to cause said image capture device to capture an image projected onto said image receiving region by said zoom lens, and wherein said controller is operative to set magnification and focus parameters of the zoom lens in accordance with default values stored in said storage device.

37. An apparatus according to claim 36, wherein said image capture device includes an image sensor and an image storage device coupled thereto, and further including a dither device which controllably varies the spatial location at which an image projected by said zoom lens device is incident upon said image sensor, and wherein said controller is operative to cause said image storage device to store, for each location, the incident image.

38. An apparatus according to claim 37, further including a color filter mechanism containing a plurality of respectively different color filters that are sequentially insertable in the path of said projected image, and wherein said controller is operative to cause the insertion of successive ones of said respectively different color filters in the path of said projected image and to cause said image storage device to store successively selected color components of the projected image.

39. An apparatus according to claim 27,
   wherein said control mechanism includes means for storing information representative of the orientation of said image on said image receiving region.

* * * * *